(12) United States Patent
Maruyama et al.

(10) Patent No.: US 9,800,128 B2
(45) Date of Patent: Oct. 24, 2017

(54) LINEAR DC MOTOR

(71) Applicant: Harmonic Drive Systems Inc., Shinagawa-ku, Tokyo (JP)

(72) Inventors: Toshiki Maruyama, Azumino (JP); Tomoki Terashima, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 391 days.

(21) Appl. No.: 14/423,228

(22) PCT Filed: Jan. 18, 2013

(86) PCT No.: PCT/JP2013/000238
§ 371 (c)(1),
(2) Date: Feb. 23, 2015

(87) PCT Pub. No.: WO2014/041711
PCT Pub. Date: Mar. 20, 2014

(65) Prior Publication Data
US 2015/0229196 A1    Aug. 13, 2015

Related U.S. Application Data

(63) Continuation-in-part of application No. PCT/JP2012/005910, filed on Sep. 14, 2012.

(51) Int. Cl.
*H02K 41/03* (2006.01)
*H02K 41/035* (2006.01)
(Continued)

(52) U.S. Cl.
CPC ......... *H02K 41/0356* (2013.01); *G02B 7/023* (2013.01); *H02K 11/21* (2016.01)

(58) Field of Classification Search
CPC ..... H02K 41/0356; H02K 11/21; G02B 7/023
(Continued)

(56) References Cited

U.S. PATENT DOCUMENTS 5,347,500 A * 9/1994 Eguchi ............... G11B 7/08564
                                                          369/44.14
5,532,989 A * 7/1996 Getreuer .............. G11B 5/5526
                                                          369/44.15
(Continued)

FOREIGN PATENT DOCUMENTS

JP          58-211363 A    12/1983
JP          1-129750 A      5/1989
(Continued)

OTHER PUBLICATIONS

International Search Report (PCT/ISA/210) dated Apr. 23, 2013, by the Japanese Patent Office as the International Searching Authority for International Application No. PCT/JP2013/000238.

*Primary Examiner* — Terrance Kenerly
(74) *Attorney, Agent, or Firm* — Buchanan Ingersoll & Rooney PC

(57) ABSTRACT

A linear DC motor having first and second drive coils and first and second drive magnets arranged in a symmetrical state in relation to a motor central axis that passes through a sliding member in which a lens is mounted. The first and second coils on a moveable side are positioned to both the left and right sides of the sliding member. The first and second drive coils are designed to be independent without being affected by the shape, size, arrangement position, and the like of the sliding member, a linear guide, and a detection part. The first and second drive coils have high rigidity and do not deform when the sliding member slides. Accordingly, it is possible to obtain a linear DC motor that has a highly rigid moveable part and performs positioning action with high responsiveness and high precision.

7 Claims, 8 Drawing Sheets

(51) Int. Cl.
 *G02B 7/02* (2006.01)
 *H02K 11/21* (2016.01)
(58) Field of Classification Search
 USPC .......................................... 310/12.12, 12.15
 See application file for complete search history.

(56) References Cited

U.S. PATENT DOCUMENTS

| | | | |
|---|---|---|---|
| 6,532,199 B1* | 3/2003 | Getreuer | G11B 5/5526 369/44.14 |
| 6,741,529 B1* | 5/2004 | Getreuer | G11B 5/5526 360/78.06 |
| 8,487,485 B2* | 7/2013 | Tang | H02K 41/031 310/12.18 |
| 2002/0130562 A1* | 9/2002 | Tamura | H02K 41/0356 310/12.16 |
| 2008/0024015 A1* | 1/2008 | Tanioka | H02K 41/0356 310/14 |

FOREIGN PATENT DOCUMENTS

| | | |
|---|---|---|
| JP | 2-65645 A | 3/1990 |
| JP | 5-62383 A | 3/1993 |
| JP | 5-328696 A | 12/1993 |
| JP | 2003-88082 A | 3/2003 |
| JP | 2008-035645 A | 2/2008 |
| JP | 2011-237507 A | 11/2011 |

\* cited by examiner

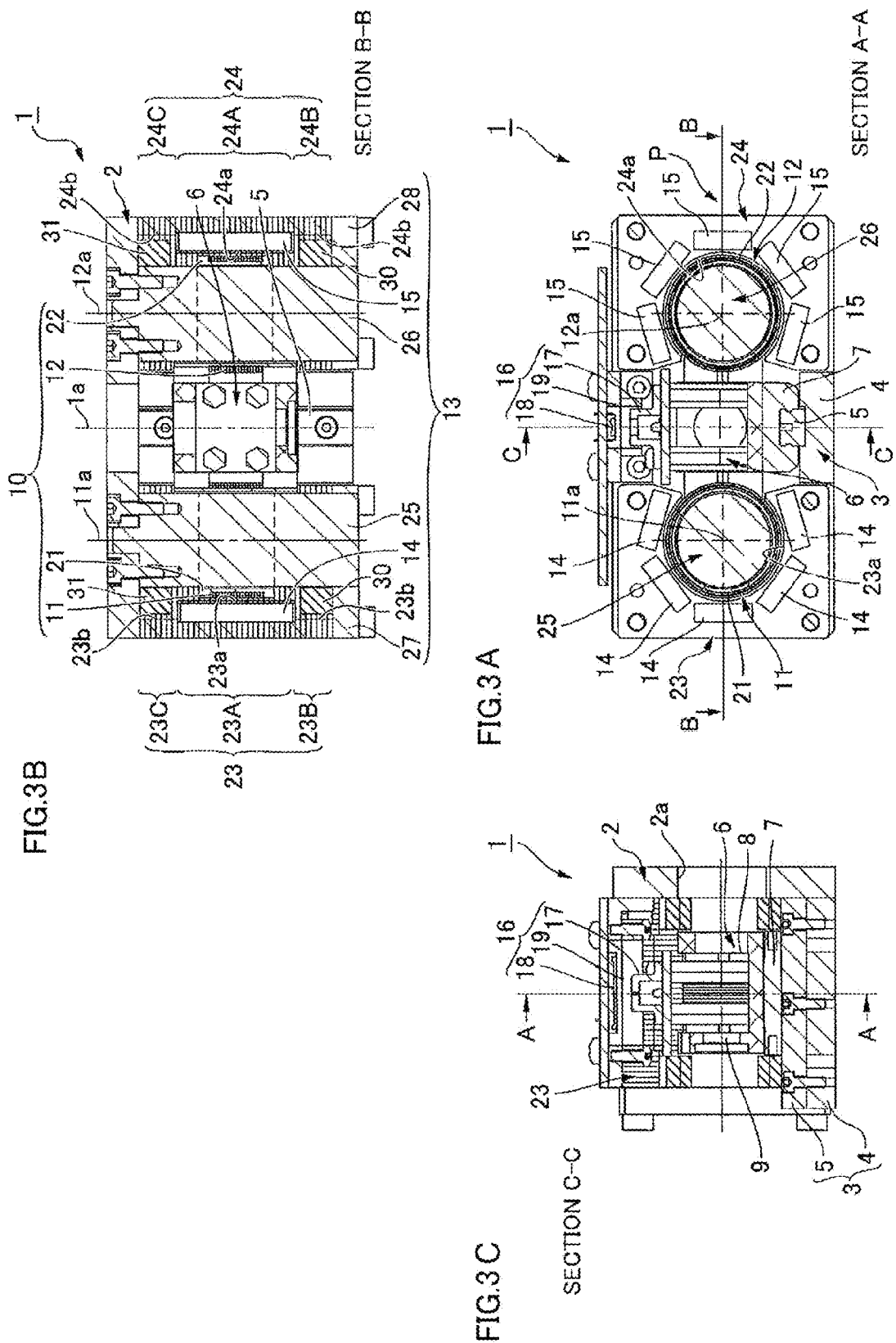

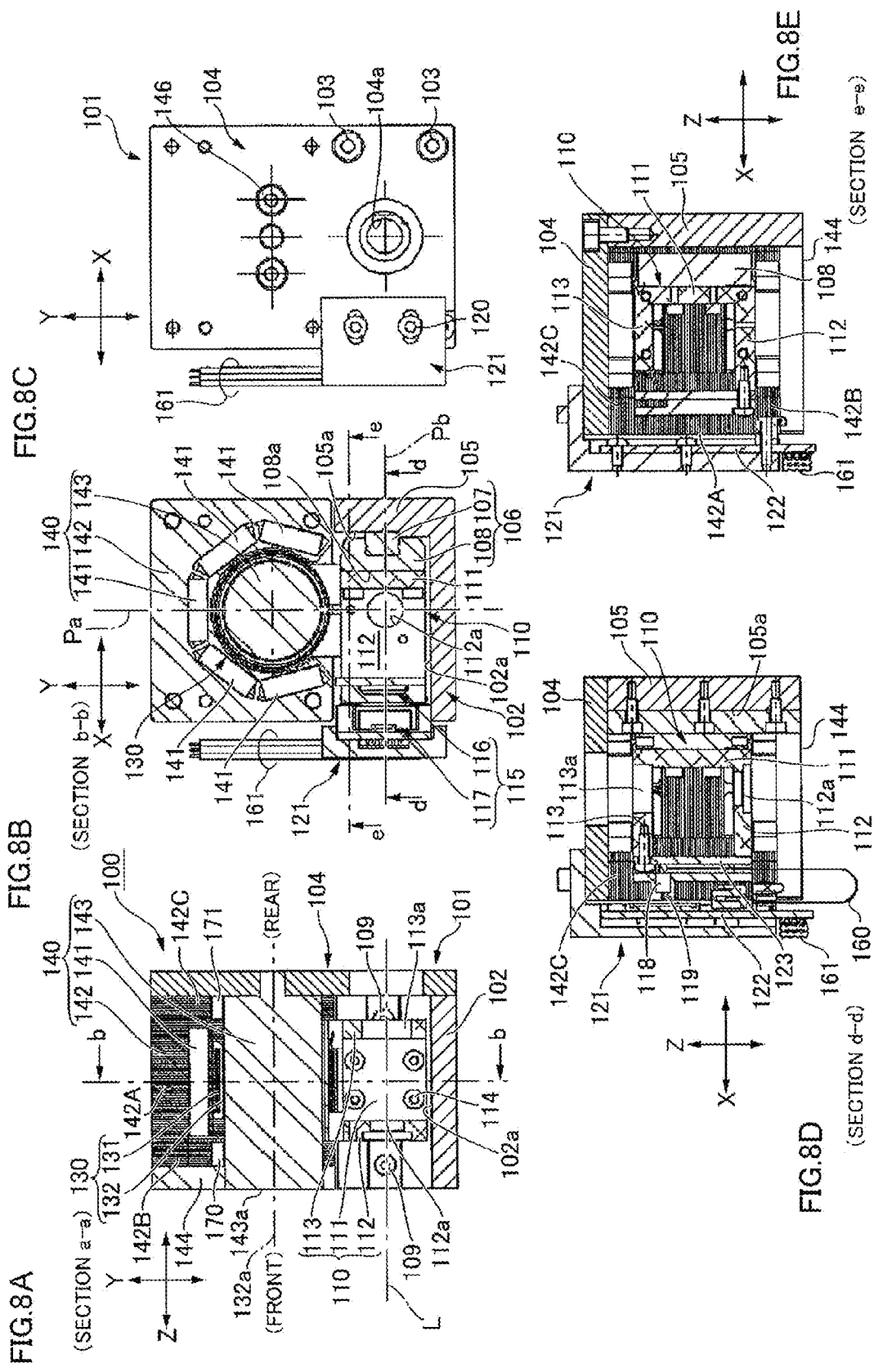

LINEAR DC MOTOR

TECHNICAL FIELD

The present invention relates to a linear direct-current (DC) motor suitable for use in positioning a lens or the like, and particularly relates to a linear DC motor capable of performing positioning with high responsiveness and high precision.

BACKGROUND ART

Linear actuators that utilize a voice coil motor to highly responsively move and focus a lens, among other actions, are widely used. In the linear actuator disclosed in Patent Document 1, the center of a linear guide for guiding a movable element that performs a linear reciprocating motion is aligned with the center of gravity of the movable element, whereby durability and precision of positioning are improved.

The linear actuator disclosed in Patent Document 1 has a coil, and a coil assembly comprising a rectangular coil frame for supporting the coil. A linear guide, a frame for attaching a lens, a sensor for detecting the position of the movable element, and other members are disposed inside the coil frame.

PRIOR ART DOCUMENTS

Patent Documents

[Patent Document 1] JP2008-35645A

SUMMARY OF THE INVENTION

Problems to be Solved by the Invention

In the linear actuator of Patent Document 1, the components are installed inside the rectangular coil assembly. Therefore, the coil assembly is relatively large, and the rigidity thereof may be reduced. When moving the lens frame, the sensor, or another movable component using thrust generated between the coil assembly and a stator-side permanent magnet, the rectangular coil assembly may deform without resisting the thrust. If the rectangular coil assembly deforms while moving a movable component, a slight delay may occur in the movement of the movable element, and responsiveness may be reduced. Additionally, resonance may be generated in the coil assembly, and the responsiveness and precision of positioning of the movable element may be reduced.

An objective of the present invention is to provide a linear DC motor capable of increasing the rigidity of a movable element and performing positioning with high responsiveness and high precision.

Means to Solve the Problems

In order to address the problem described above, a linear DC motor of the present invention is characterized in having:

a sliding member on which an object to be moved is mounted;

a linear guide for supporting the sliding member so as to allow sliding along a guide rail extending linearly;

a motor movable element comprising a first drive coil and a second drive coil, the motor movable element being attached to the sliding member;

a motor stator comprising a first drive magnet and a second drive magnet for causing magnetic drive force to be generated between the first and second drive coils, the magnetic drive force being generated in a sliding direction along the guide rail;

a detection unit for detecting the position, in the sliding direction, of the sliding member; and a base member to which the linear guide, the motor stator, and the detection unit are attached;

the first drive coil and the second drive coil being cylindrical coils of identical size and shape, the coil windings thereof being wound in a cylindrical shape around a coil center axis that extends parallel to the sliding direction;

the first drive coil and the second drive coil being disposed in positions that are bilaterally symmetric about a motor center axis that passes through the center of the sliding member and extends parallel to the sliding direction;

the first drive magnet and the second drive magnet facing the first drive coil and the second drive coil in positions that are bilaterally symmetric about the motor center axis;

the guide rail being disposed on one side of a plane including both of the coil center axes of the first and second drive coils, and the detection unit being disposed on the other side of the plane including both of the coil center axes of the first and second drive coils.

In the linear DC motor of the present invention, cylindrical first and second drive coils and first and second drive magnets are disposed in positions that are bilaterally symmetric about a motor center axis that passes through the center of a sliding member on which a lens or other object to be moved is mounted. The first and second movable-side drive coils are positioned on the two sides of the sliding member. Accordingly, the first and second drive coils can be designed independently of the sliding member, the linear guide, the detection unit, and other members, and irrespectively with regard to the shape, size, position, or other attributes of these members. As a result, sufficient rigidity is readily imparted to the first and second drive coils so that no deformation occurs in the drive coils when the sliding member is made to slide by magnetic drive force. Additionally, the first and second drive coils and the first and second drive magnets are easily designed so that thrust necessary to the sliding member can be obtained.

In the present invention, magnetic drive force is generated in positions occupying a bilaterally symmetric relationship with respect to the motor center axis that passes through the center of the sliding member. Additionally, the linear guide and the detection unit are disposed on either end with respect to a direction perpendicular to the direction in which the first and second drive coils are disposed, with respect to the slide member. Accordingly, a member that is attached to the sliding member and slides along the linear guide, and a member attached to the sliding-member-side of the detection unit, are readily disposed so as to be well balanced with respect to the sliding member.

It is accordingly simple to arrive at a design whereby the center of sliding-direction thrust caused to act on the sliding member by the magnetic drive force is aligned with the center of gravity of the sliding member. By aligning the center of sliding-direction thrust with the center of gravity, it is possible to prevent or suppress the application of excessive stress to the linear guide slidably supporting the sliding member, and reduce slide resistance between the sliding member and the linear guide. This makes it possible to cause the sliding member to slide with high responsiveness, and to position the sliding member with high precision. Because no excessive stress is produced in the linear guide or other members, the service life in these locations is also improved.

BRIEF DESCRIPTION OF THE DRAWINGS

FIGS. 3A-C are a cross-sectional view of the linear DC motor of FIG. 1 taken along line A-A, a cross-sectional view of the same taken along line B-B, and a cross-sectional view of the same taken along line C-C;

FIGS. 8A-E are a longitudinal cross-sectional view of the linear DC motor of FIG. 6 taken along line a-a, a horizontal cross-sectional view of the same taken along line b-b, a rear view of the same, a cross-sectional view of the same taken along line d-d, and a cross-sectional view of the same taken along line e-e.

MODE FOR CARRYING OUT THE INVENTION

An embodiment of a linear DC motor to which the present invention is applied is described below with reference to the annexed drawings. The linear DC motor described below is used as a lens-driving linear actuator for, e.g., focusing a lens. As shall be apparent, the linear DC motor of the present invention can also be used to cause an object to be moved other than a lens to perform a linear reciprocating motion.

Embodiment 1

Figure 1A:
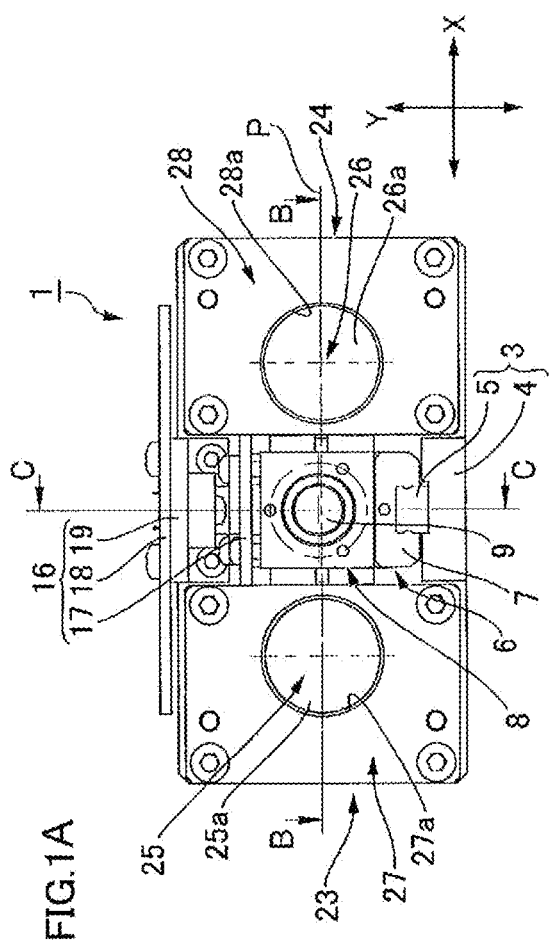
FIGS. 1A-C are a front view, a bottom view, and a side view of a linear DC motor according to a first embodiment of the present invention.
Figure 1B:
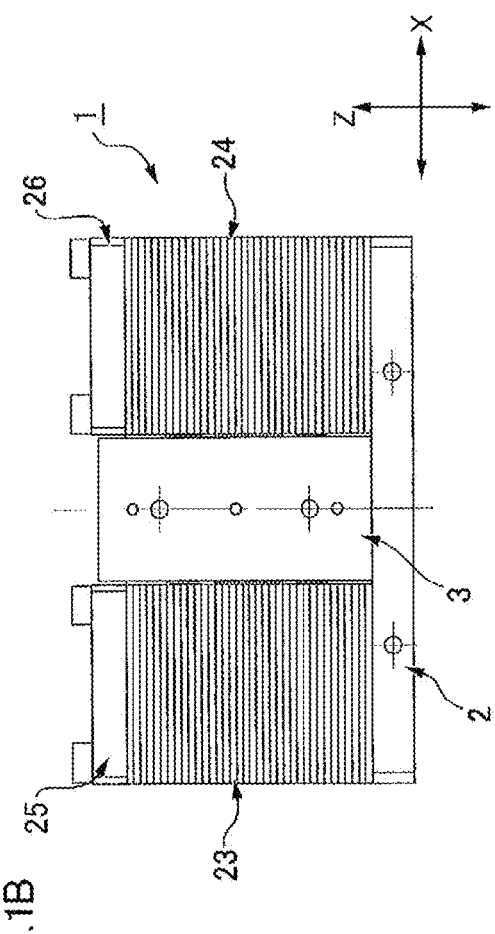
Figure 1C:
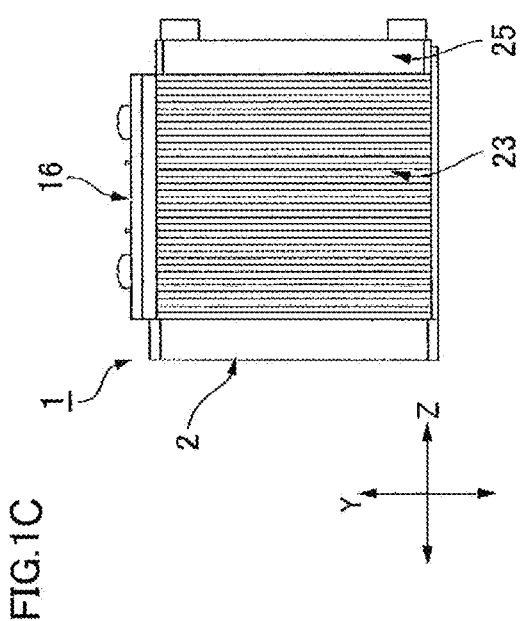
Figure 2A:
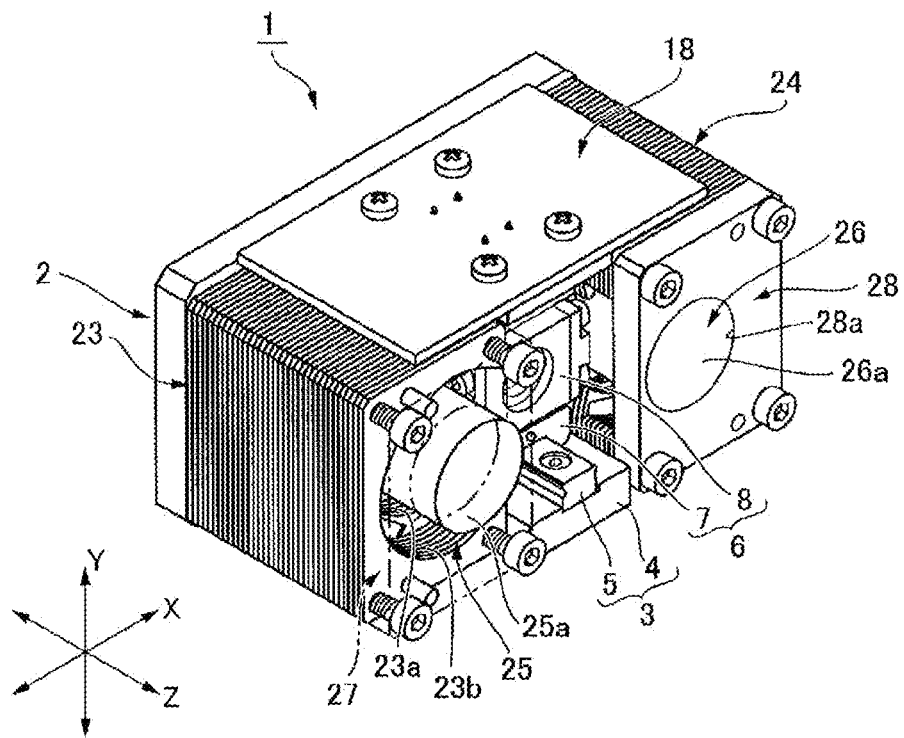
FIGS. 2A-B are a perspective view of the linear DC motor of FIG. 1 as seen from the front, and a perspective view of the same as seen from the rear.

FIGS. 1A, B and C are a front view, a bottom view, and a side view of a linear DC motor according to a first embodiment. FIGS. 2A and B are a perspective view of the linear DC motor as seen from the front, and a perspective view of the same as seen from the rear. For expediency of description, the linear DC motor is described below in accordance with the motor installation orientation shown in the drawings, with X representing the widthwise motor direction, Y representing the vertical motor direction, and Z representing the longitudinal motor direction.

As shown in these drawings, the linear DC motor 1 has an overall rectangular parallelepiped shape, the rear surface thereof being defined by a base plate 2 having a rectangular contour of fixed thickness. Fixed-side structural components of the linear DC motor 1 are attached to the base plate 2.

A linear guide 3, which is a fixed-side structural component, is attached to the base plate 2. The linear guide 3 extends frontward from the widthwise-motor-direction-X center of the base plate 2 along the longitudinal motor direction Z. The linear guide 3 comprises a linear plate 4, and a guide rail 5 attached to an upper surface thereof. A sliding member 6, which is a movable-side structural component of the linear DC motor 1, is mounted on the linear guide 3 in a state in which the sliding member 6 can slide in the longitudinal motor direction Z along the guide rail 5.

Figure 2B:
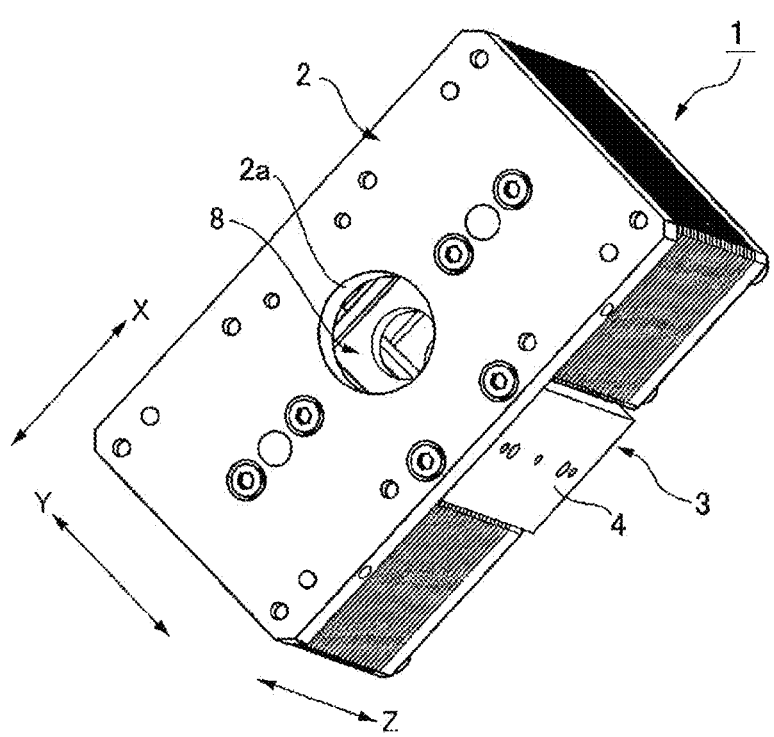

The sliding member 6 comprises a slider 7 slidably mounted on the guide rail 5, and a lens frame 8 of rectangular parallelepiped shape fixed above the slider 7. A circular opening 8a passes through the longitudinal-motor-direction-Z center of the lens frame 8. A lens 9 is concentrically fixed in the circular opening 8a. A circular opening 2a (see FIG. 2B) is formed in the center part of the base plate 2, whereby an optical path extending so as to pass through the linear DC motor 1 in the longitudinal motor direction Z via the lens 9 is formed.

Figure 4:
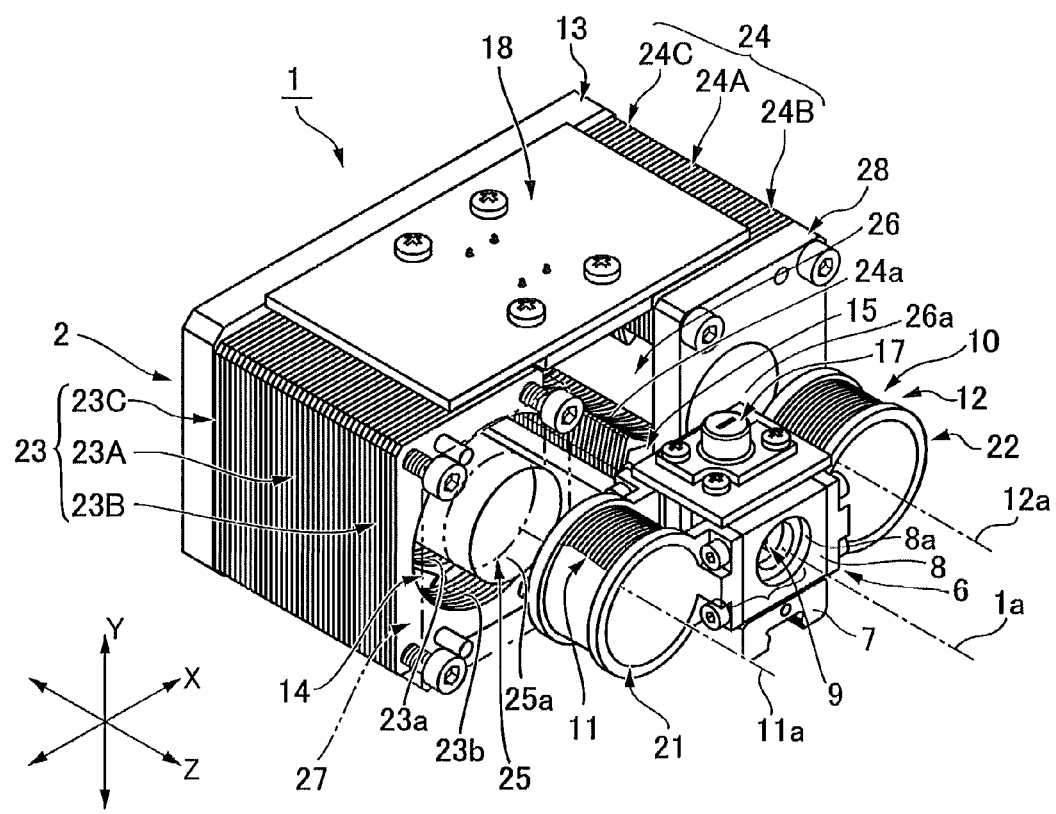
FIG. 4 is a perspective view of the linear DC motor of FIG. 1 with the sliding-side portion thereof extracted.

FIGS. 3A through 3C are cross-sectional views of the linear DC motor 1 taken along lines A-A, B-B, and C-C. FIG. 4 is a perspective view of the linear DC motor 1 with the sliding-side portion thereof extracted.

The following description makes reference to these drawings. A motor movable element 10 of the linear DC motor 1 is mounted on the sliding member 6. The motor movable element 10 comprises a first drive coil 11 disposed on one side of the sliding member 6 with respect to the widthwise motor direction X, and a second drive coil 12 disposed on the other side of the sliding member 6 with respect to the widthwise motor direction X. The first and second drive coils 11, 12 are disposed in positions that are bilaterally symmetric about a motor center axis 1a. The motor center axis 1a passes through the center of the circular opening 8a, which is the center of the sliding member 6, and extends in the longitudinal motor direction Z, which is the direction in which the sliding member 6 slides.

A motor stator 13 of the linear DC motor 1 comprises a plurality of first drive magnets 14 and a plurality of second drive magnets 15. The first drive magnets 14 and the second drive magnets 15 are disposed in a bilaterally symmetric state about the motor center axis 1a. When the first and second drive coils 11, 12 are energized, magnetic drive force is generated between the first and second drive coils 11, 12 and the first and second drive magnets 14, 15, the magnetic drive force being generated in the sliding direction (longitudinal motor direction Z) along the guide rail 5.

A detection unit 16 for detecting the slide position of the sliding member 6 is mounted on the linear DC motor 1. The detection unit 16 comprises a movable-side detection unit 17 mounted on the upper surface of the sliding member 6, and a fixed-side detection unit 18 attached on the base plate 2-side, as is evident from FIGS. 2 and 4. The fixed-side detection unit 18 is mounted on a sensor plate 19 fixed to the base plate 2. The detection unit 16 is an optical position detector comprising, e.g., a light-emitting unit mounted on the movable-side detection unit 17 and a light-receiving unit mounted on the fixed-side detection unit 18.

The movable components of the linear DC motor 1 comprise the sliding member 6, the lens 9 mounted thereon, the motor movable element 10, and the movable-side detection unit 17. The fixed components of the linear DC motor 1 comprise the linear guide 3 attached to the base plate 2, the motor stator 13, and the fixed-side detection unit 18.

The configurations of the motor movable element 10 and the motor stator 13 will now be further described. First, the motor movable element 10 will be described. The first drive coil 11 of the motor movable element 10 is a cylindrical coil, the coil windings thereof being wound in a cylindrical shape around a coil center axis 11a that extends parallel to the sliding direction (longitudinal motor direction Z) of the sliding member 6. In the present example, a first cylindrical coil frame 21 comprising a non-magnetic material is attached to one side surface of the lens frame 8. A coil winding is wound along a circular outer-peripheral surface of the first cylindrical coil frame 21.

The second drive coil 12 is configured in a similar manner. The second drive coil 12 is a cylindrical coil, the coil windings thereof being wound in a cylindrical shape around a coil center axis 12$a$ that extends parallel to the sliding direction (longitudinal motor direction Z) of the sliding member 6. A second cylindrical coil frame 22 comprising a non-magnetic material is attached to the other side surface of the lens frame 8. A coil winding is wound along a circular outer-peripheral surface of the second cylindrical coil frame 22.

The first and second drive coils 11, 12 are cylindrical coils of identical size and shape. As described previously, the first drive coil 11 and the second drive coil 12 are disposed in positions that are bilaterally symmetric, in the widthwise motor direction X, about a motor center axis 1$a$ that extends parallel to the sliding direction (longitudinal motor direction Z) through the center of the sliding member 6 (center of the circular opening 8$a$).

Next, the motor stator 13 will be described. The first drive magnet 14 and the second drive magnet 15 of the motor stator 13 correspond to the first and second drive coils 11, 12, and are disposed in positions that are bilaterally symmetric about a motor center axis 1$a$. The motor stator 13 comprises first and second outer yokes 23, 24, and first and second inner yokes 25, 26. The first and second outer yokes 23, 24 are disposed in positions that are bilaterally symmetric about the motor center axis 1$a$, and are of identical size and shape. Similarly, the first and second inner yokes 25, 26 are disposed in positions that are bilaterally symmetric about the motor center axis 1$a$, and are of identical size and shape.

The first outer yoke 23 has an overall rectangular parallelepiped contour, and is a layered structure having layered ferromagnetic plates. The first outer yoke 23 in the present example comprises a first yoke portion 23A, and a second yoke portion 23B and third yoke portion 23C of identical shape connected to the front and rear of the first yoke portion 23A. The rear end of the third yoke portion 23C on the rear side in the longitudinal motor direction Z is fixed to the base plate 2, and a first end yoke 27 of identical contour is fixed to the front end of the second yoke portion 23B on the front side in the longitudinal motor direction Z.

A hollow portion of circular cross-section extends in the longitudinal motor direction Z through the interior of the first outer yoke 23 configured as described above, as is evident from FIG. 4. The circular inner-peripheral surface of the hollow portion opens on the sliding member 6-side. The first cylindrical coil frame 21 on which the first drive coil 11 is installed is inserted coaxially into the hollow portion. A yoke circular inner-peripheral surface 23$a$ of the first yoke portion 23A defining the hollow portion faces the first drive coil 11 across a fixed gap. Yoke circular inner-peripheral surfaces 23$b$ of the second yoke portion 23B and third yoke portion 23C located forward and rearward of the first yoke portion 23A are of greater inner diameter than the yoke circular inner-peripheral surface 23$a$. Therefore, the yoke circular inner-peripheral surfaces 23$b$ of the second and third yoke portions 23B, 23C face the circular outer-peripheral surface of the first inner yoke 25 across a gap which is larger than the gap between the first yoke portion 23A and the circular outer-peripheral surface of the first inner yoke 25. This prevents short-circuiting in the magnetic path between the motor movable element 10 and the motor stator 13.

A plurality of first drive magnets 14 (e.g., five) are embedded inside the first yoke portion 23A, the first drive magnets 14 being located at equiangular intervals in the circumferential direction in the first yoke portion 23A, along the yoke circular inner-peripheral surface 23$a$ thereof. In the present example, the first drive magnets 14, of oblate rectangular cross-section, extend over substantially the entire length of the first yoke portion 23A in the longitudinal motor direction Z. The first drive magnets 14 are disposed on the inner side of the yoke circular inner-peripheral surface 23$a$ in an orientation extending in the direction of a tangent drawn at the closest point on the yoke circular inner-peripheral surface 23$a$.

The first inner yoke 25 extends coaxially through the hollow portion in the first drive coil 11. The rear end of the first inner yoke 25 is fixed to the base plate 2, and the front end surface 25$a$ of the first inner yoke 25 is exposed to the front via a circular through-hole 27$a$ formed in the first end yoke 27.

The second outer yoke 24 is of the same configuration as the first outer yoke 23. The second outer yoke 24 in the present example comprises a first yoke portion 24A, and a second yoke portion 24B and third yoke portion 24C of identical shape connected to the front and rear of the first yoke portion 24A. The rear end of the third yoke portion 24C on the rear side in the longitudinal motor direction Z is fixed to the base plate 2, and a second end yoke 28 of identical contour is fixed to the front end of the second yoke portion 24B on the front side in the longitudinal motor direction Z.

A hollow portion of circular cross-section extends in the longitudinal motor direction Z through the interior of the second outer yoke 24. The circular inner-peripheral surface of the hollow portion opens on the sliding member 6-side. The second cylindrical coil frame 22 on which the second drive coil 12 is installed is inserted coaxially into the hollow portion. A yoke circular inner-peripheral surface 24$a$ of the first yoke portion 24A defining the hollow portion faces the second drive coil 12 across a fixed gap. Yoke circular inner-peripheral surfaces 24$b$ of the second yoke portion 24B and third yoke portion 24C located forward and rearward of the first yoke portion 24A are of greater inner diameter than the yoke circular inner-peripheral surface 24$a$. Therefore, the yoke circular inner-peripheral surfaces 24$b$ of the second and third yoke portions 24B, 24C face the circular outer-peripheral surface of the second inner yoke 26 across a gap which is larger than the gap between the first yoke portion 24A and the circular outer-peripheral surface of the second inner yoke 26. This prevents short-circuiting in the magnetic path between the motor movable element 10 and the motor stator 13.

A plurality of second drive magnets 15 (e.g., five) are embedded inside the first yoke portion 24A, the second drive magnets 15 being located at equiangular intervals in the circumferential direction in the first yoke portion 24A, along the yoke circular inner-peripheral surface 24$a$ thereof. The second drive magnets 15, of oblate rectangular cross-section, extend over substantially the entire length of the first yoke portion 24A in the longitudinal motor direction Z. The second drive magnets 15 are disposed on the inner side of the yoke circular inner-peripheral surface 24$a$, in an orientation extending in the direction of a tangent drawn at the closest point on the yoke circular inner-peripheral surface 24$a$.

The second inner yoke 26 extends coaxially through the hollow portion in the second drive coil 12. The rear end of the second inner yoke 26 is fixed to the base plate 2, and the front end surface 26a of the second inner yoke 26 is exposed to the front via a circular through-hole 28a formed in the second end yoke 28.

As shown in FIG. 3, stoppers 30, 31 comprising a buffer material are each disposed at a longitudinal location between the first inner yoke 25 and first outer yoke 23 and a longitudinal location between the second inner yoke 26 and second outer yoke 24. Specifically, a stopper 30 is disposed between the first inner yoke 25 and the second yoke portion 23B of the first outer yoke 23, and a stopper 31 is disposed between the first inner yoke 25 and the third yoke portion 23C of the first outer yoke 23. Similarly, a stopper 30 is disposed between the second inner yoke 26 and the second yoke portion 24B of the second outer yoke 24, and a stopper 31 is disposed between the second inner yoke 26 and the third yoke portion 24C of the second outer yoke 24. The front-side stoppers 30 are attached to the first and second end yokes 27, 28, and the rear-side stoppers 31 are attached to the base plate 2. The motor movable element 10 (sliding member 6) can slide in the longitudinal motor direction Z between the front and rear stoppers 30, 31.

Next, as is evident from FIGS. 1A, 3A, and 3B, a plane P including both of the coil center axes 11a, 12a of the first and second drive coils 11, 12 in the linear DC motor 1 has the linear guide 3 disposed on one side thereof and the detection unit 16 disposed on the other side thereof. Specifically, the slider 7 is attached to one side of the sliding member 6 with respect to the vertical motor direction Y, and the movable-side detection unit 17 is mounted on the other side of the sliding member 6 with respect to the vertical motor direction Y.

The first and second drive coils 11, 12 of the motor movable element 10 are attached to both sides of the sliding member 6, with respect to the widthwise motor direction X, in a bilaterally symmetric state. Sliding-direction thrust acts on the sliding member 6 due to the magnetic drive force generated between the first and second drive magnets 14, 15 of the motor stator 13 and the first and second drive coils 11, 12 of the motor movable element 10. The center of the thrust acting on the sliding member 6 is positioned above the motor center axis 1a, and the center of gravity of the motor movable element 10 is positioned at the motor center axis 1a (center of the sliding member 6).

Therefore, the slider 7 and the movable-side detection unit 17 disposed on either side of the sliding member 6 in the vertical direction are well-balanced, whereby the position of the center of gravity of the sliding member 6 can be positioned at the center thereof (at the motor center axis 1a). This makes it possible to cause the sliding member 6 to move with high responsiveness and position the sliding member 6 with high precision, without excessive stress acting on the linear guide or other members while the sliding member 6 is sliding. Because the production of excessive stress in the parts can be suppressed, it is also possible to improve durability.

Modification of Embodiment 1

Figure 5:
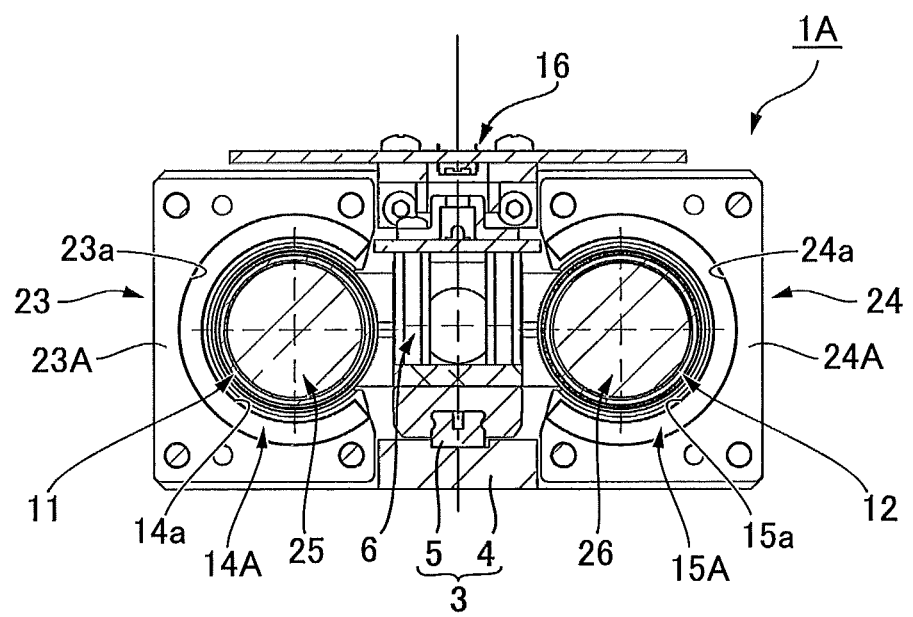
FIG. 5 is a schematic, lateral cross-sectional view showing main portions of a modification of the linear DC motor of FIG. 1.

FIG. 5 is a schematic horizontal cross-sectional view showing the principal components of a linear DC motor according to a modification of the linear DC motor 1 described above. The linear DC motor 1A according to the modification is of basically the same configuration as the linear DC motor 1 described above. Accordingly, components of the linear DC motor 1A that correspond to components of the linear DC motor 1 are given the same symbols, and are not redundantly described.

In the linear DC motor 1A, first and second drive magnets 14A, 15A of the motor stator 13 are formed from C-shaped magnets of fixed thickness and width. Specifically, the first drive magnet 14A comprising a C-shaped magnet open on the sliding member 6-side is concentrically fixed to the circular inner-peripheral surface 23a of the yoke portion 23A of the first outer yoke 23. The first drive magnet 14A describes, e.g., an arcuate shape spreading across substantially 270°, a circular inner-peripheral surface 14a of the first drive magnet 14A facing the first drive coil 11 across a fixed gap.

Similarly, the second drive magnet 15A comprising a C-shaped magnet open on the sliding member 6-side is concentrically fixed to the circular inner-peripheral surface 24a of the yoke portion 24A of the second outer yoke 24. The second drive magnet 15A describes, e.g., an arcuate shape spreading across substantially 270°, a circular inner-peripheral surface 15a of the second drive magnet 15A facing the second drive coil 12 across a fixed gap.

The first and second drive magnets 14A, 15A are of identical size and shape, and are disposed, in a bilaterally symmetric state, in positions that are bilaterally symmetric about the motor center axis 1a.

The linear DC motor 1A configured as described above achieves the same operation and effect as the linear DC motor described previously.

In the linear DC motors 1, 1A described above, the first and second outer yokes 23, 24 are configured as layered structures having ferromagnetic plates. However, the first and second outer yokes 23, 24 can instead be an integrated object comprising integrated structures, e.g., sintered compacts. Even in this case, the same operation and effect is achieved as in the cases of the linear DC motors 1, 1A described above.

Embodiment 2

Figure 6:
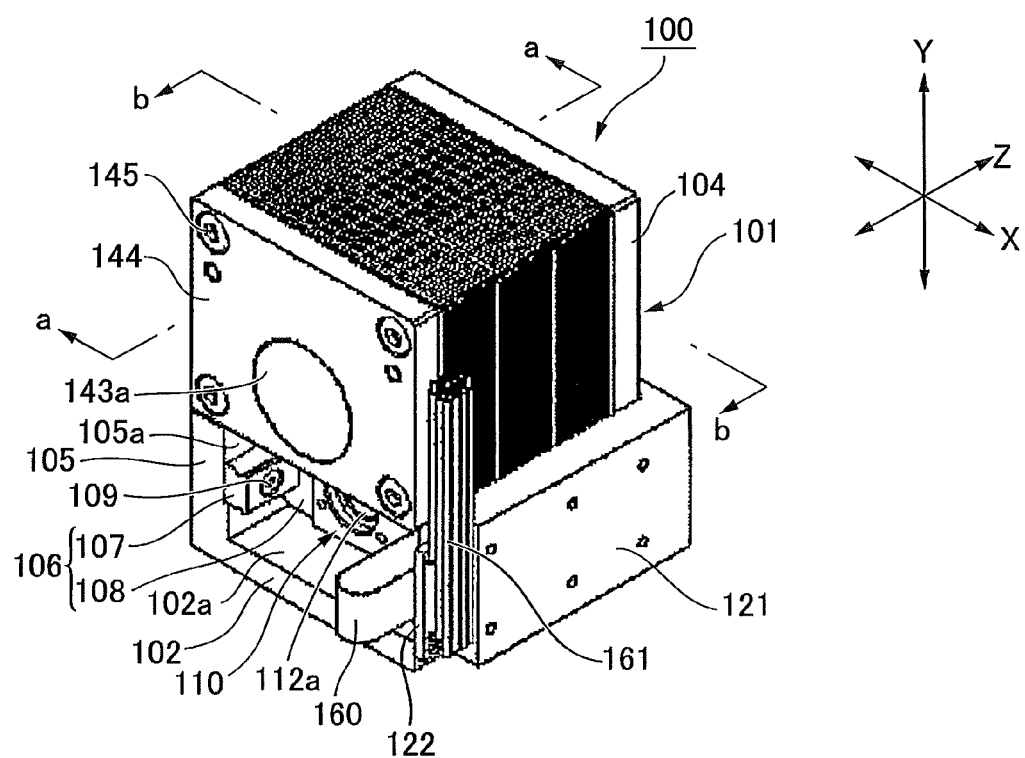
FIG. 6 is a perspective view of a linear DC motor according to a second embodiment of the present invention.
Figure 7B:
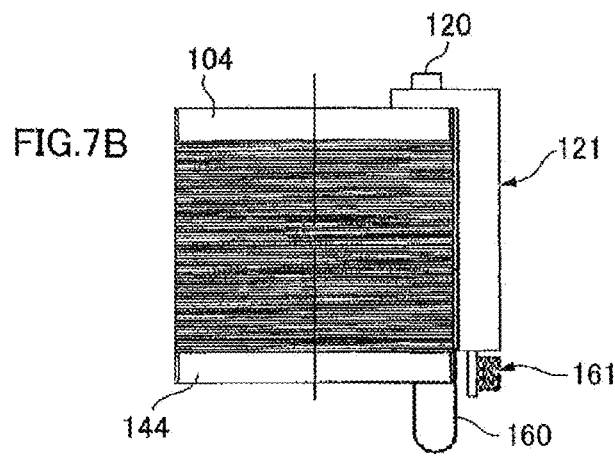
FIGS. 7A-D are a front view, a plan view, a bottom view, and a left-side view of the linear DC motor of FIG. 6.
Figure 7D:
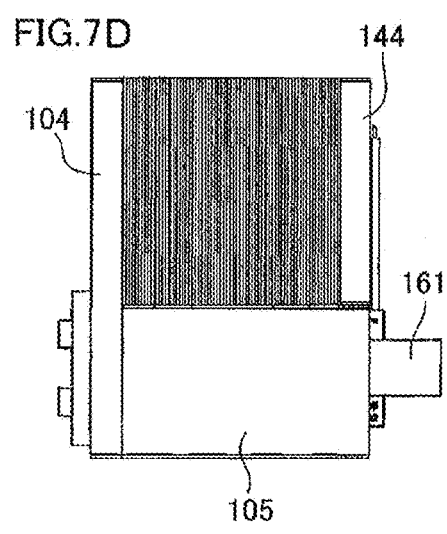
Figure 7A:
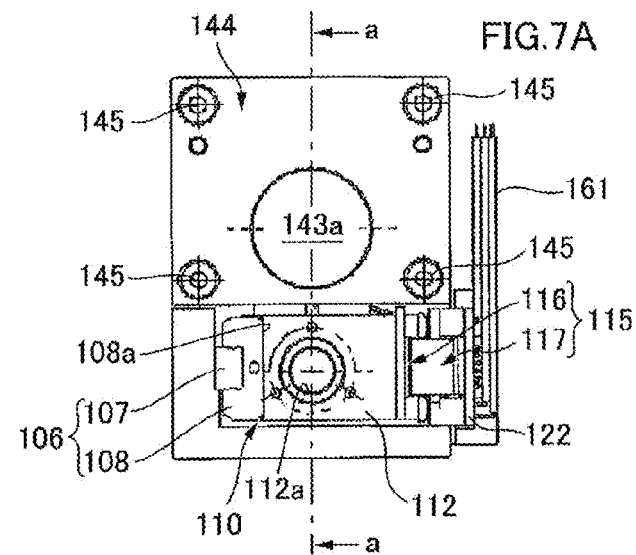
Figure 7C:
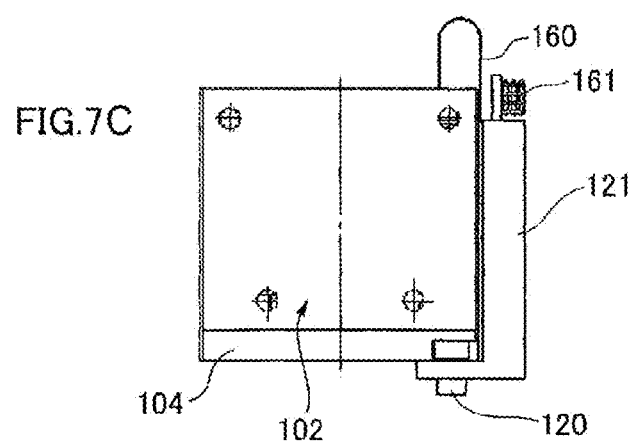

Next, a linear DC motor according to a second embodiment of the present invention will be described with reference to FIGS. 6-8. FIG. 6 is a perspective view of a linear DC motor according to a second embodiment as seen from the front. FIGS. 7A through 7D are respectively a front view, a plan view, a bottom view, and a left-side view of the linear DC motor. FIGS. 8A through 8E are respectively a vertical cross-sectional view of the linear DC motor taken along line a-a, a horizontal cross-sectional view of the same taken along line b-b, a rear view of the same, a cross-sectional view of the same taken along line d-d, and a cross-sectional view of the same taken along line e-e. For expediency of description, the linear DC motor is described below in accordance with the motor installation orientation shown in the drawings, with X representing the widthwise motor direction, Y representing the vertical motor direction, and Z representing the longitudinal motor direction.

The linear DC motor 100 has an overall rectangular parallelepiped shape, a motor frame 101 thereof comprising a bottom plate 102 having a rectangular contour of fixed thickness and a rear plate 104 having a rectangular contour of fixed thickness. The bottom plate 102 has formed thereon a rectangular side plate part 105 of fixed width and thickness. The side plate part 105, as seen from the front, extends upward from the left-side end part of the bottom plate 102, bent at a right angle. The rear end of the side plate part 105 is fastened securely to the rear plate 104 by a fixing screw 103 (see FIG. 8C).

A linear guide 106 is disposed on a vertical side surface 105a inside the side plate part 105 of the motor frame 101.

The linear guide 106 is configured from a guide rail 107, which is a fixed-side component, and a slider 108, which is a movable-side component. The guide rail 107 is fixed to the perpendicular side surface 105a of the side plate part 105 by a fixing screw 109. The guide rail 107 is disposed at a position in the perpendicular side surface 105a that is located a prescribed height above the surface 102a of the bottom plate 102, the guide rail 107 extending horizontally in the longitudinal motor direction Z from the front end of the perpendicular side surface 105a to the rear plate 104. The slider 108 engages with the guide rail 107 in a state in which the slider 108 is capable of sliding in the longitudinal motor direction Z along the guide rail 107.

A flat vertical surface 108a extending in the vertical motor direction Y and the longitudinal motor direction Z is formed on the slider 108. A lens frame 110 (slider frame) is mounted on the vertical surface 108a. The lens frame 110 comprises: a perpendicular bottom plate 111 of fixed thickness having a rectangular contour extending in the longitudinal motor direction; a perpendicular front plate 112 of fixed thickness having a rectangular contour extending, from the front end of the perpendicular bottom plate 111, in the widthwise motor direction X; and a perpendicular rear plate 113 of fixed thickness having a rectangular contour extending, from the rear end of the perpendicular bottom plate 111, in the widthwise motor direction X. The perpendicular bottom plate 111 is fixed to the vertical surface 108a of the slider 108 by a fixing screw 114.

A circular opening 112a is formed in the perpendicular front plate 112 so as to pass through in the longitudinal motor direction. A lens (not shown), which is an object to be moved, is concentrically fixed in the circular opening 112a. A circular opening 113a is also formed, coaxially with the circular opening 112a, in the perpendicular rear plate 113 so as to pass through in the longitudinal motor direction. A circular opening 104a is also formed, coaxially with the circular opening 113a, in the rear plate 104 of the motor frame 101. Because the front-side portion of the perpendicular front plate 112 in the motor frame 101 opens frontward, an optical path extending so as to pass through the linear DC motor 100 in the longitudinal motor direction Z is formed by the lens and the circular openings 113a, 104a.

In the lens frame 110 as seen from the front, a detection unit 115 is disposed on a right-side position in the widthwise motor direction X (a position opposite the linear guide 106). The detection unit 115 detects the position of the slider 108, or more accurately, the position in the longitudinal motor direction Z of the lens mounted on the lens frame 110. The detection unit 115 comprises a movable-side detection unit 116 mounted on the lens frame 110, and a fixed-side detection unit 117 attached on the motor frame 101-side. The detection unit 116 is an optical position detector comprising, e.g., a light-emitting unit 118 mounted on the movable-side detection unit 116 and a light-receiving unit 119 mounted on the fixed-side detection unit 117.

The movable-side detection unit 117 is mounted on an attaching flange 121 which is fixed to the rear plate 104 of the motor frame 101 by a fixing screw 120. The attaching flange 121, as seen from the front, is a plate member having a rectangular contour extending frontward along the motor side surface from the right-side end of the rear plate 104. A rectangular fixed-side circuit board 122 is layered on a perpendicular side surface on an inner side of the attaching flange 121. A light-receiving unit 119 is mounted on an inner-side surface of the fixed-side circuit board 122.

The movable-side detection unit 116 comprises a movable-side circuit board 123 having a rectangular contour and bridging between distal end surfaces of the perpendicular front plate 112 and perpendicular rear plate 113 of the lens frame 110, and a light-emitting unit 118 mounted on a surface of the movable-side circuit board 123. The light-emitting unit 118 moves in the longitudinal motor direction Z along a light-receiving surface of the light-receiving unit 119 of the fixed-side detection unit 117 at positions facing the light-receiving unit 119 at fixed intervals.

Next, a motor movable element 130 and a motor stator 140 of the linear DC motor 100 are disposed on the upper side of the lens frame 110 in the vertical motor direction. The motor movable element 130 comprises a drive coil 131. The drive coil 131 is a cylindrical coil and comprises a coil winding wound about the outer peripheral surface of a cylindrical coil frame 132. The cylindrical coil frame 132 comprises a non-magnetic material, the open edge parts on both (longitudinal motor direction) sides thereof being connected securely to upper-side side parts of the perpendicular front plate 112 and perpendicular rear plate 113 of the lens frame 110 in the vertical motor direction.

Here, in order to reduce the moment in the direction of pitching generated as the lens frame 110 slides, it is preferable to set the center of motor thrust and the center of gravity of the movable components so as to be aligned in the widthwise motor direction X or positioned in maximum proximity. For example, when the center of motor thrust is positioned on the motor center axis (on the center axis 132a of the cylindrical coil frame 132) and the center of gravity of the movable components is positioned on the optical axis of the lens mounted on the lens frame 110, these centers are positioned, e.g., in the same vertical plane Pa.

The motor stator 140 of the linear DC motor 100 comprises a plurality of drive magnets 141, an outer yoke 142, and an inner yoke 143. When the drive magnets 141 are energized, magnetic drive force is generated between the drive coil 131 and the drive magnets 141, the magnetic drive force being generated in the sliding direction (longitudinal motor direction Z) along the guide rail 107.

The outer yoke 142 has an overall rectangular parallelepiped contour, and is a layered structure having layered ferromagnetic plates. The outer yoke 142 comprises a first yoke portion 142A, and second and third yoke portions 142B, 142C of identical shape connected to the front and rear of the first yoke portion 142A. The rear end of the second yoke portion 142C on the rear side in the longitudinal motor direction Z is fixed to the rear plate 104, and an end yoke 144 of identical contour is fixed to the front end of the second yoke portion 142B on the front side in the longitudinal motor direction Z. Specifically, the end yoke 144 is fastened securely to the rear plate 104 by four fixing bolts 145 so as to sandwich the outer yoke 142 from the motor front side.

A hollow portion of circular cross-section extends in the longitudinal motor direction Z through the interior of the outer yoke 142. The circular inner-peripheral surface of the hollow portion opens on the sliding member 108-side. The cylindrical coil frame 132 on which the drive coil 131 is installed is inserted coaxially into the hollow portion. A yoke circular inner-peripheral surface of the first yoke portion 142A defining the hollow portion faces the drive coil 131 across a fixed gap. Yoke circular inner-peripheral surfaces of the second yoke portions 142B, 142C located forward and rearward of the first yoke portion 142A are of greater inner diameter than the yoke circular inner-peripheral surface of the first yoke portion 142A. Therefore, the yoke circular inner-peripheral surfaces of the second and third yoke portions 142B, 142C face the circular outer-peripheral surface of the inner yoke 143 across a gap which is larger than the gap between the first yoke portion 142A and the circular outer-peripheral surface of the inner yoke 143. This prevents short-circuiting in the magnetic path between the motor movable element 130 and the motor stator 140.

A plurality of drive magnets 141 (e.g., five) are embedded inside the first yoke portion 142A, the drive magnets 141 being located at equiangular intervals in the circumferential direction in the first yoke portion 142A, along the yoke circular inner-peripheral surface thereof. In the present example, the drive magnets 141, of oblate rectangular cross-section, extend over substantially the entire length of the first yoke portion 142A in the longitudinal motor direction Z. The drive magnets 141 are disposed on the inner side of the yoke circular inner-peripheral surface in an orientation extending in the direction of a tangent drawn at the closest point on the yoke circular inner-peripheral surface.

The inner yoke 143 extends coaxially through the hollow portion in the drive coil 131. The rear end of the inner yoke 143 is fixed to the rear plate 104 of the motor frame 101, and the front end surface 143a of the inner yoke 143 is exposed to the front via a circular through-hole 27a formed in the first end yoke 144. The front end surface 143a of the inner yoke 143 and the front end surface of the first end yoke 144 are positioned in the same vertical plane.

As shown in FIG. 8A, stoppers 170, 171 comprising a buffer material are each disposed at a longitudinal location between the inner yoke 143 and outer yoke 142. Specifically, a stopper 170 is disposed between the inner yoke 143 and the second yoke portion 142B of the outer yoke 142, and a stopper 171 is disposed between the inner yoke 143 and the third yoke portion 142C of the outer yoke 142. The front-side stopper 170 is attached to the end yokes 144, and the rear-side stopper 171 is attached to the rear plate 104. The motor movable element 130 can slide in the longitudinal motor direction Z between the front and rear stoppers 170, 171.

The movable components in the linear DC motor 100 are thus configured from the slider 108, the lens frame 110, the motor movable element 130, and the movable-side detection unit 116. The fixed components in the linear DC motor 100 are configured from the motor frame 101, the guide rail 107 attached thereto, the motor stator 140, and the fixed-side detection unit 117.

The movable components and the fixed components are electrically connected via a flexible printed circuit board 160 protruding in a U-shape toward the front of the motor. Specifically, one end of the flexible printed circuit board 160 is connected to a connector (not shown) mounted on the fixed-side circuit board 122 attached to the side of the motor frame 101, and the other end of the flexible printed circuit board 160 is connected to a connector (not shown) mounted on the movable-side circuit board 123 attached to the movable-side lens frame 110. An external wiring group 161 is led upward in the vertical motor direction Y along the front end of the attaching flange.

In the linear DC motor 100, as with the case shown in FIG. 5, C-shaped magnets of fixed thickness and width can be used instead of the plurality of drive magnets 141. The outer yoke 142 is configured as a layered structure having a layered ferromagnetic plate. However, the outer yoke 142 can instead be an integrated object comprising an integrated structure, e.g., a sintered compact.

As described above, the linear DC motor 100 of the second embodiment has:
a lens frame (110) on which a lens is mounted;
a linear guide (106) for supporting the lens frame (110) so as to allow sliding along a guide rail (107) extending linearly in the longitudinal motor direction (Z);
a motor movable element (130) comprising a drive coil (131), the motor movable element (130) being attached to the lens frame (110);
a motor stator (140) comprising a drive magnet (141) for causing magnetic drive force to be generated with the drive coil, the magnetic drive force being generated in a sliding direction along the guide rail (107);
a detection unit (115) for detecting the position, in the sliding direction, of the lens frame (110); and
a motor frame (101) to which fixed-side positions of the linear guide (106), the motor stator (140), and the detection unit (115) are attached;
the drive coil (131) being a cylindrical coil, the coil winding thereof being wound in a cylindrical shape around a center axis (132a) that extends parallel to the sliding direction;
the lens frame (110), linear guide (106), and detection unit (115) being disposed below the motor stator (140) and motor movable element (130) with respect to the vertical motor direction (Y);
the linear guide (106) being disposed on one side of the lens frame (110) with respect to the widthwise motor direction (X), and the detection unit (115) being disposed on the other side of the lens frame (110) with respect to the widthwise motor direction (X).

Here, the sliding-direction center axis of the linear guide (106) and the detection position of the detection unit (115) are preferably located, in the vertical motor direction (Y), at either the same position (positions in the same plane Pb in FIG. 8B) or in maximum proximity.

The center of motor thrust acting on movable components including the motor movable element (130) and the lens frame (110) and the center of gravity of the movable components are preferably located, in the widthwise motor direction (X), at either the same position or in maximum proximity.

Furthermore, the motor movable element (130) can be configured from a drive coil (131) wound about a circular outer-peripheral surface of a cylindrical coil frame (132) comprising a non-magnetic material. The motor stator (140) can be configured so as to comprise an outer yoke (142) and an inner yoke (143). In this case, the drive coil (131) can be concentrically encircled by the outer yoke, and the inner yoke (143) can be a columnar inner yoke extending so as to concentrically pass through the hollow portion of the cylindrical coil frame (132).

Furthermore, the drive magnet (141) can be a plurality of drive magnets disposed at equiangular intervals inside the outer yoke (142), along an inner circumferential surface thereof. Alternatively, the drive magnet can instead be a C-shaped magnet fixed to the inner peripheral surface of the outer yoke (142) in a state of concentrically encircling the drive coil (131).

Next, it is preferable that:
the outer yoke (142) comprises a first yoke portion (141A), and a second yoke portion (142B) and third yoke portion (142C) of identical shape connected to the front and rear of the first yoke portion (142A) in the longitudinal motor direction (Z);
a yoke circular inner-peripheral surface of the first yoke portion (142A) faces the drive coil (131) across a fixed gap;
yoke circular inner-peripheral surfaces of the second yoke portion (142B) and third yoke portion (142C) are of greater inner diameter than the yoke circular inner-peripheral surface of the first yoke portion (142A); and the yoke circular inner-peripheral surfaces of the second and third yoke portions (142B, 142C) face the circular outer-peripheral surface of the inner yoke (143) across a gap larger than the gap between the first yoke portion (142A) and the circular outer-peripheral surface of the inner yoke (143).

When the linear DC motor (100) has a first stopper (170) and a second stopper (171) for defining a range in which the motor movable element (130) can slide, the first stopper (170) can be disposed between the inner yoke (143) and the second yoke portion (142B) of the outer yoke (142), and the second stopper (171) can be disposed between the inner yoke (143) and the third yoke portion (143C) of the outer yoke (142).

The invention claimed is:

1. A linear DC motor comprising:
a sliding member on which an object to be moved is mounted;
a linear guide for supporting the sliding member so as to allow sliding along a guide rail extending linearly;
a motor movable element having a first drive coil and a second drive coil, the motor movable element being attached to the sliding member;
a motor stator having a first drive magnet and a second drive magnet for causing magnetic drive force to be generated between the first and second drive coils, the magnetic drive force being generated in a sliding direction along the guide rail;
a detection unit for detecting a position, in the sliding direction, of the sliding member; and
a base member to which the linear guide, the motor stator, and a fixed-side part of the detection unit are attached;
the first drive coil and the second drive coil being cylindrical coils of identical size and shape, coil windings of the cylindrical coils being wound in a cylindrical shape around coil center axes that extend parallel to the sliding direction;
the first drive coil and the second drive coil being disposed in positions that are bilaterally symmetric about a motor central axis that passes through a center of the sliding member and extends parallel to the sliding direction;
the first drive magnet and the second drive magnet facing the first drive coil and the second drive coil in positions that are bilaterally symmetric about the motor central axis;
the linear guide being disposed on one side of a plane including both of the coil center axes of the first and second drive coils, and the detection unit being disposed on the other side of the plane including both of the coil center axes of the first and second drive coils, wherein:
the motor movable element has first and second cylindrical coil frames comprising non-magnetic materials attached to the sliding member in positions that are bilaterally symmetric about the motor central axis, the first and second drive coils being wound along a circular outer-peripheral surface of the first and second cylindrical coil frames;
the motor stator has a first outer yoke and a second outer yoke disposed in positions that are bilaterally symmetric about the motor central axis, the first and second outer yokes being of identical size and shape, and a first inner yoke and a second inner yoke disposed in positions that are bilaterally symmetric about the motor central axis, the first and second inner yokes being of identical size and shape;
the first outer yoke and the second outer yoke concentrically encircle the first drive coil and the second drive coil, respectively; and
the first inner yoke and the second inner yoke are columnar inner yokes extending so as to concentrically pass through hollow portions in the first cylindrical coil frame and the second cylindrical coil frame, respectively.

2. The linear DC motor of claim 1, wherein the first drive magnet and the second drive magnet are each a plurality of drive magnets disposed at equiangular intervals in the first outer yoke and the second outer yoke, along inner-peripheral surfaces thereof.

3. The linear DC motor of claim 1, wherein the first drive magnet and the second drive magnet are each C-shaped magnets fixed to inner peripheral surfaces of the first outer yoke and the second outer yoke, respectively, in a state of concentrically encircling the first drive coil and the second drive coil.

4. The linear DC motor of claim 1, wherein:
the first outer yoke and the second outer yoke each has a first yoke portion, and a second yoke portion and third yoke portion of identical shape connected to the front and rear of the first yoke portion in the direction of the motor central axis;
the yoke circular inner-peripheral surfaces of the first yoke portions face the first and second drive coils across a fixed gap;
yoke circular inner-peripheral surfaces of the second yoke portion and the third yoke portion are of greater inner diameter than the yoke circular inner-peripheral surface of the first yoke portion; and
the yoke circular inner-peripheral surfaces of the second and third yoke portions face the circular outer-peripheral surfaces of the first and second inner yokes across a gap which is larger than the gap between the first yoke portion and the circular outer-peripheral surface of the first and second inner yokes.

5. The linear DC motor of claim 4, comprising:
first stoppers and second stoppers for defining a range in which the motor movable element can slide along the motor central axis;
the first stoppers being disposed between the first and second inner yokes and the second yoke portions of the first and second outer yokes, respectively; and
the second stoppers being disposed between the first and second inner yokes and the third yoke portions of the first and second outer yokes, respectively.

6. The linear DC motor of claim 2, wherein:
the first outer yoke and the second outer yoke each has a first yoke portion, and a second yoke portion and third yoke portion of identical shape connected to the front and rear of the first yoke portion in the direction of the motor central axis;
the yoke circular inner-peripheral surfaces of the first yoke portions face the first and second drive coils across a fixed gap;
yoke circular inner-peripheral surfaces of the second yoke portion and the third yoke portion are of greater inner diameter than the yoke circular inner-peripheral surface of the first yoke portion; and
the yoke circular inner-peripheral surfaces of the second and third yoke portions face the circular outer-peripheral surfaces of the first and second inner yokes across a gap which is larger than the gap between the first yoke portion and the circular outer-peripheral surface of the first and second inner yokes.

7. The linear DC motor of claim 3, wherein:

the first outer yoke and the second outer yoke each has a first yoke portion, and a second yoke portion and third yoke portion of identical shape connected to the front and rear of the first yoke portion in the direction of the motor central axis;

the yoke circular inner-peripheral surfaces of the first yoke portions face the first and second drive coils across a fixed gap;

yoke circular inner-peripheral surfaces of the second yoke portion and the third yoke portion are of greater inner diameter than the yoke circular inner-peripheral surface of the first yoke portion; and the yoke circular inner-peripheral surfaces of the second and third yoke portions face the circular outer-peripheral surfaces of the first and second inner yokes across a gap which is larger than the gap between the first yoke portion and the circular outer-peripheral surface of the first and second inner yokes.

\* \* \* \* \*